RADIO COMMUNICATION SYSTEM

Filed June 18, 1947

4 Sheets-Sheet 1

Inventors
J.C.O'Brien and R.B.Haner
By Neil W. Preston,
Their Attorney

Inventors
J. C. O'Brien and R. B. Haner
By Neil W. Preston
Their Attorney

RADIO COMMUNICATION SYSTEM

Filed June 18, 1947

Inventors
J.C. O'Brien and R.B. Haner
By Neil W. Preston,
Their Attorney

Inventors
J.C.O'Brien and R.B.Haner
By
Neil W. Preston,
Their Attorney

Patented June 20, 1950 2,512,530

UNITED STATES PATENT OFFICE 2,512,530

RADIO COMMUNICATION SYSTEM

John C. O'Brien, Rochester, and Robert B. Haner, Scottsville, N. Y., assignors to General Railway Signal Company, Rochester, N. Y.

Application June 18, 1947, Serial No. 755,372

13 Claims. (Cl. 250—9)

This invention relates to multiple channel radio communication systems, and it more particularly pertains to a communication system in which respective frequency modulation and amplitude modulation communication channels are provided on a single radiated carrier wave.

It is often desirable to transmit intelligence from two independent sources at a transmitter station simultaneously to a remote, or mobile, receiver station on the same carrier wave, both for the purpose of reducing to a minimum the equipment required, and for the purpose of expanding communication facilities for a single assigned carrier frequency. A typical application is found in a railway radio communication system where two control, or dispatching, offices are located relatively close together for governing the operation of mobile units which can be selectively governed by one office or the other, in accordance with their location and/or assignment.

It is an object of the present invention to transmit intelligence in two communication channels simultaneously, substantially without interference, by respective amplitude modulation and frequency modulation of a single carrier wave.

Another object of the present invention is to receive an amplitude modulated and frequency modulated carrier wave and detect intelligence applied to the carrier wave by respective amplitude modulation and frequency modulation, with substantially no interference between the amplitude modulation and frequency modulation channels.

Another object of the present invention, in receiving a carrier wave both amplitude modulated and frequency modulated, is to reduce the frequency modulated carrier to a constant beat frequency, and thereby allow substantially undistorted detection without interference of the amplitude modulation channel of the receiver.

Another object of the present invention, in apparatus for receiving a carrier wave having both amplitude and frequency modulation, is to modulate a second oscillator in accordance with a phase corrected output of the frequency modulation channel, and to heterodyne such oscillator with an intermediate frequency of the frequency modulated carrier, and thereby obtain an amplitude modulated constant frequency signal.

Another object of the present invention is to provide a two-channel communication system in which two control stations transmit simultaneously and on the same carrier wave to a plurality of mobile stations, a single transmitter being common to the two control stations, one control station effecting frequency modulation of the carrier wave, and the other control station effecting amplitude modulation of the carrier wave; and in which the mobile stations have their respective receivers adapted to select the reception of either the frequency modulation or amplitude modulation channels which are applied to the same carrier wave, and thereby select as to whether they are to be responsive to one control station or the other in accordance with the assignment and/or location of such mobile stations.

Other objects, purposes and characteristic features of the present invention will be in part obvious from the accompanying drawings, and in part pointed out as the description progresses.

In describing the invention in detail reference is made to the accompanying drawings, in which corresponding reference characters and legends refer to corresponding parts throughout the several illustrations and in which.

Figures 4, 5:
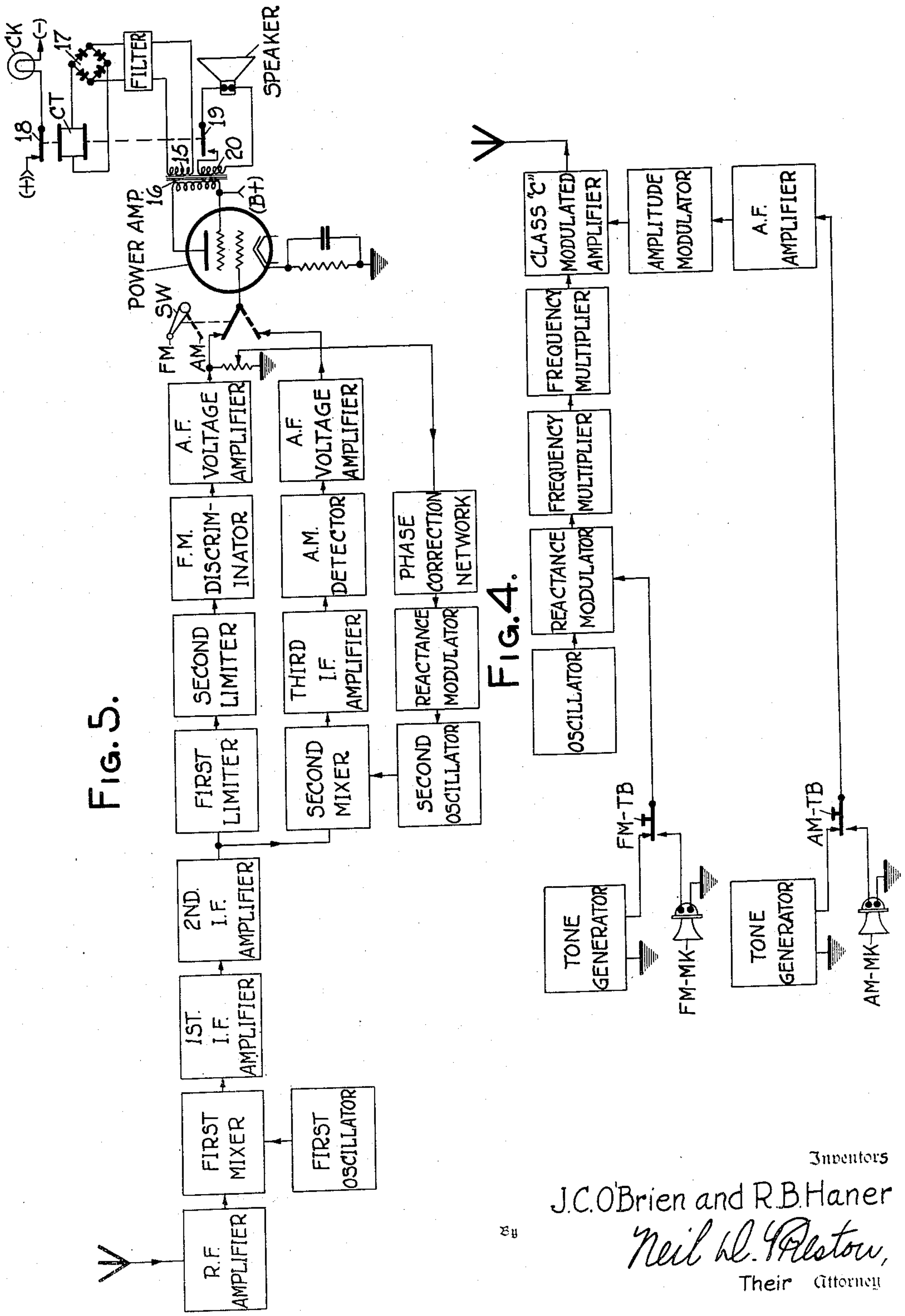
Fig. 4 illustrates a means for applying a check tone to the respective amplitude modulation and frequency modulation channels of a transmitter adapted to transmit a carrier wave having both amplitude and frequency modulation.
Figure 6:
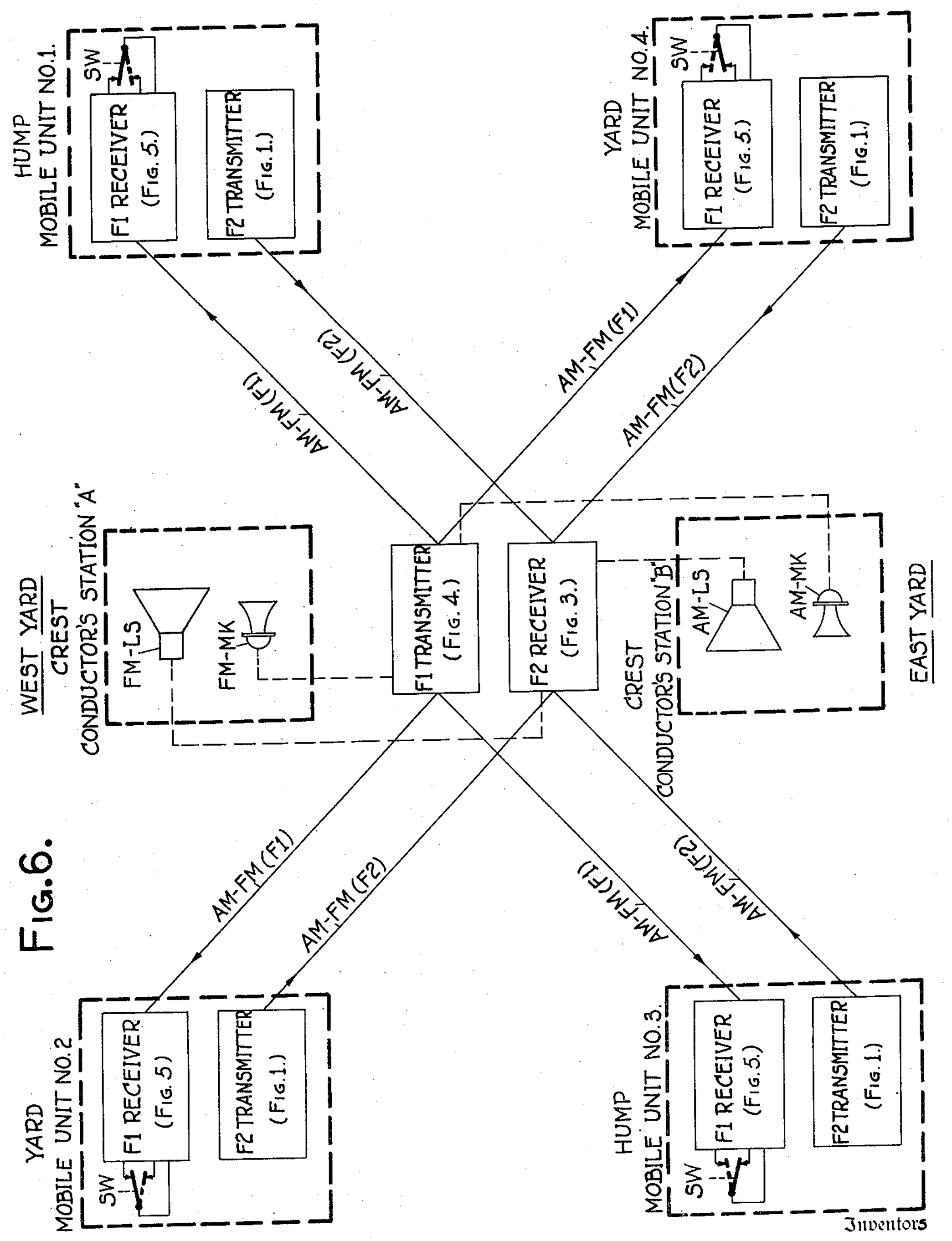

Fig. 5 illustrates a receiver adapted to be responsive to either the amplitude modulation or the frequency modulation channel of a carrier wave subject contemporaneously to both of such modulations; and Fig. 6 illustrates diagrammatically a railway radio communication system employing transmitting and receiving apparatus affording both amplitude modulation and frequency modulation channels simultaneously on a single carrier wave.

With reference to the accompanying drawings, schematic circuit diagrams have been used for the purpose of illustrating more particularly the mode of operation and principles involved than for illustrating the specific structure and arrangement of parts that would be employed in practice; and the symbol (B+) is used to designate the connection to the positive terminal of a suitable direct current power supply (not shown), the negative terminal of which is connected to ground.

Figure 1:
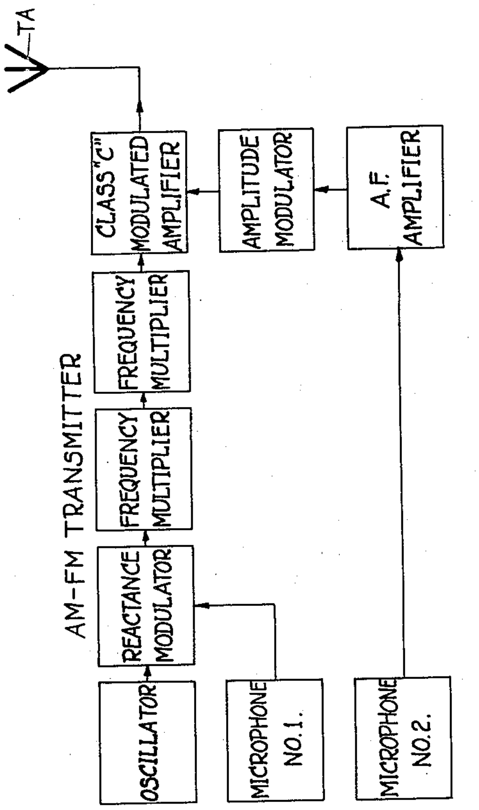
Fig. 1 is a block diagram illustrating a transmitter organization of conventional elements for the radiation of a carrier wave having both amplitude and frequency modulation.

With reference to Fig. 1, it is illustrated that a carrier wave of a given fundamental frequency is radiated by the antenna TA from the AM-FM transmitter. The AM-FM transmitter comprises the conventional elements of an FM transmitter including successively, a suitable oscillator for generating a basic carrier frequency, and a reactance modulator for modulating the carrier output of the oscillator in accordance with the various voice frequencies impressed upon the microphone No. 1. The frequency modulated carrier thus produced is fed through conventional frequency multiplier stages as required to obtain the desired frequency deviation ratio, and to obtain the assigned frequency for radiation from the antenna TA. The output of the last frequency multiplier stage is fed through amplifier stages as required, which may include the class "C" modulated amplifier stage illustrated in Fig. 1.

The voice frequencies impressed upon the microphone No. 2, when amplified as required by a suitable audio frequency amplifier are fed into a conventional amplitude modulator, the output of which in turn is effective in any suitable manner, such as by grid or plate modulation, to modulate the already frequency modulated carrier with amplitude modulations in an amplifier stage of the transmitter such, for example, as in the final class "C" modulated amplifier stage as shown in Fig. 1. Thus, with reference to Fig. 1, the input to the class "C" modulated amplifier has been frequency modulated, and subsequent to the amplitude modulation effected in that stage, the output carrier of the class "C" modulated amplifier, which is radiated by the antenna TA, is frequency modulated according to microphone No. 1 and amplitude modulated according to microphone No. 2. The frequency modulation of the carrier wave may be of a deviation as required in practice. A deviation of five to one has been found satisfactory and effective to reduce noise interference in communication service.

Figure 2:
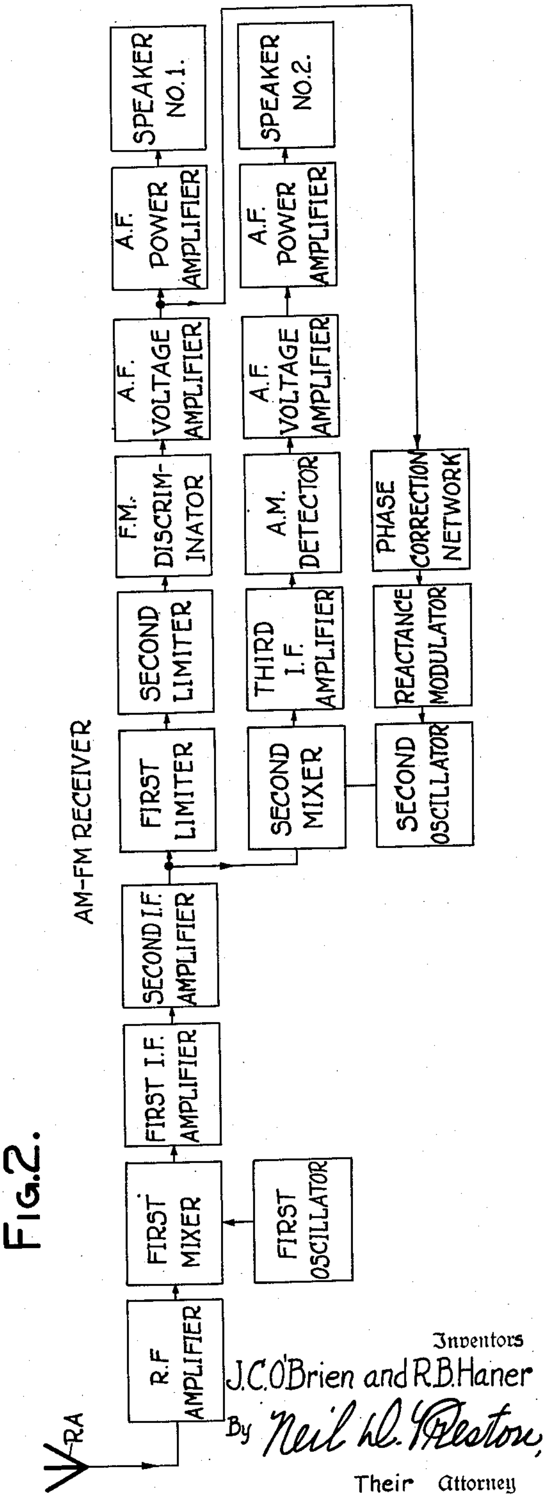
Fig. 2 is a block diagram of a receiver adapted to receive the respective amplitude modulation and frequency modulation channels of a carrier wave having both amplitude and frequency modulation.

With reference to Fig. 2, an AM-FM receiver is illustrated as having an antenna RA which it is assumed is effective to receive as separate communication channels the amplitude modulation and frequency modulation applied to a single carrier wave of the character such as would be radiated by the antenna TA of Fig. 1.

For the reception of the frequency modulation (FM) channel, the receiver apparatus is not unlike that of a conventional frequency modulation receiver in that it includes (see Fig. 2) successive conventional R. F. amplifier, first oscillator and first mixer, first I. F. amplifier, second I. F. amplifier, first limiter, second limiter, F. M. discriminator, A. F. voltage amplifier, and A. F. power amplifier stages, the output of the A. F. power amplifier being applied to the speaker No. 1 associated with the frequency modulation channel. It is to be understood that the block "Speaker No. 1" of Fig. 2 also includes a suitable output transformer according to the requirements of practice.

The successive R. F. amplifier, first oscillator and first mixer, first I. F. amplifier, and second I. F. amplifier stages (see Fig. 2) are common to the reception of both AM and FM channels in that the carrier in each of these stages of the receiver has both amplitude and frequency modulation.

The output of the A. F. voltage amplifier of the FM channel of the receiver, in addition to feeding into the A. F. power amplifier, has a multiple circuit which feeds through a phase correction network to a reactance modulator grid control circuit, which modulator, in turn, by its output, varies the frequency of the second oscillator to modulate its frequency with the same modulations that have been applied to the carrier by the FM channel.

The output of the second oscillator (see Fig. 2) is fed to a second mixer in which it is combined with the AM-FM carrier output of the second I. F. amplifier to produce an intermediate frequency which is constant, irrespective of the frequency modulation of the carrier as it is fed into the second mixer stage. Thus it can be said that the successive stages subsequent to the output of the second mixer are for the reception of the AM channel as the frequency modulations of the carrier have been removed in the second mixer. The successive stages for reception of the AM channel, following the output of the second mixer are illustrated as third I. F. amplifier, A. M. detector, A. F. voltage amplifier, A. F. power amplifier, and speaker No. 2. The block designated as "Speaker No. 2" is assumed to include a suitable output transformer as required.

Figure 3:
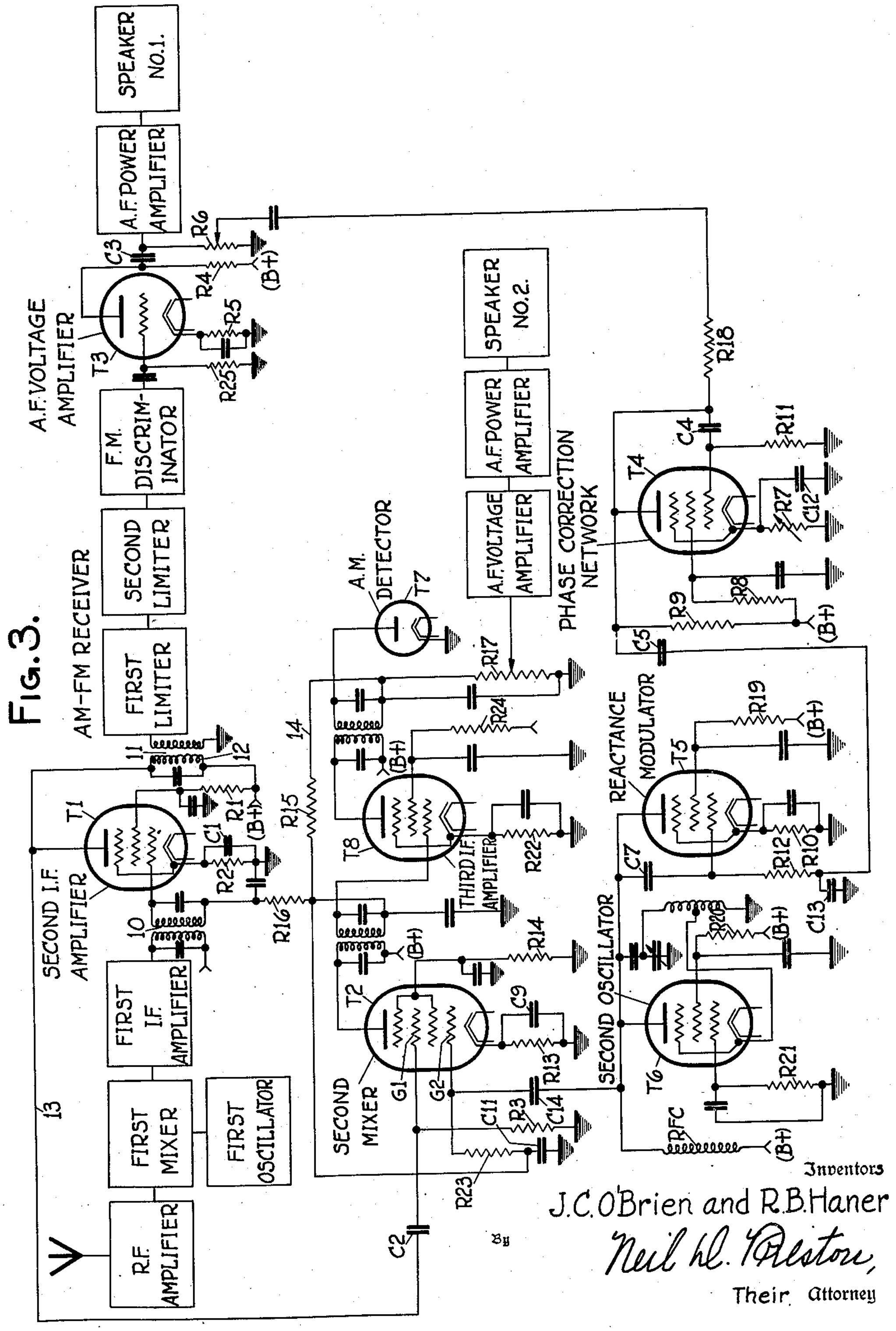
Fig. 3 illustrates schematically, and partly by block diagram, the circuit organization for the reception of the respective channels of a carrier wave having both amplitude and frequency modulation.

With reference to Fig. 3, the AM-FM receiver is more specifically illustrated, particularly as to the novel circuit organization according to the embodiment of the present invention which has been generally described with reference to Fig. 2. For the purpose of simplification of the disclosure of the present invention, certain portions of the circuit organization of Fig. 3 have been illustrated by block diagram as such elements of the circuit organization can be provided in a manner well known to those skilled in the art, the block diagram portions of Fig. 3 being readily identified as corresponding to block portions of Fig. 2 which has been described.

Thus, with reference to Fig. 3, the speaker No. 1 is responsive to the FM channel of a carrier wave which is received by the receiver organization comprising the successive circuit elements as heretofore described with reference to Fig. 2.

The second I. F. amplifier is a conventional intermediate frequency amplifier circuit organization having its input fed through an intermediate frequency transformer 10 to the control grid of the tube T1, and having the intermediate frequency transformer 11 in the output circuit of that tube. The winding 12 of the transformer is included in the anode cathode tank circuit of the tube T1, and the positive battery connection (B+) is applied to the lower terminal of such winding. (B+) is applied to the screen grid of the tube through the resistor R1, and proper bias on the grid of the tube T1 is suitably provided through the AVC circuit consisting of R17, R15 and R16 and condenser C11, and by the bias resistor R2 which is connected in the anode cathode circuit and bypassed for radio frequency currents by the condenser C1.

In addition to the tube having its output circuit coupled through the intermediate frequency transformer 11 to the first limiter stage, a connection is made by the wire 13 to the anode of the tube to provide for coupling the output of the second I. F. amplifier to ground through the condenser C2 and the resistor R3. The voltage drop across the resistor R3 acts upon the control grid G1 of the second mixer tube T2.

Another control grid G2 of the second mixer tube T2 is driven by the second oscillator, which in turn has its frequency modulated by the reactance modulator, the input to which is fed through the phase correction network from the output of the A. F. voltage amplifier tube T3, which is more directly associated with the reception of the FM channel of the carrier.

More specifically, it is illustrated in Fig. 3 that the output of the FM discriminator stage is coupled, as by suitable resistance coupling, to the control grid of the A. F. voltage amplifier tube T3, and the output of such tube T3, by resistance coupling, is coupled to an A. F. power amplifier. The anode cathode circuit of the tube extends from (B+), including a load resistor R4, and a bias resistor R5 to ground. The coupling condenser C3 allows passage of the audio frequency signal to the input of the A. F. power amplifier and also to ground through the entire resistance of the potentiometer R6. The adjustable tap of the potentiometer R6 allows the selection of a part of the output voltage of the A. F. voltage amplifier tube T3 to be applied to the control grid circuit of the reactance modulator. Such branch of the output of the A. F. voltage amplifier tube T3 is also connected through the condenser C4 to the control grid circuit of the phase correction network tube T4.

The phase correction network tube T4 is suitably biased, as the variable bias resistor R7 connected between the cathode of the tube T4 and ground, and bypassed by the condenser C12, to operate, preferably, as a class "A" amplifier. A positive battery potential (B+) is applied to the screen grid of the tube T4 through the resistor R8, and (B+) is also connected to the anode of the tube through the load resistor R9. The output of the phase correction network tube T4 is coupled by a suitable coupling condenser C5 to the grid resistor R12 of tube T5, to provide phase correction as required to match the frequency modulations of the second oscillator with the frequency modulations of the output of the second I. F. amplifier tube T1.

To consider the phase correction means more specifically, the control grid of the phase correction tube T4 is biased by a circuit including resistors R7 and R11 connected in series. The variable resistor R7 provides adjustable negative bias for the control grid of the tube T4, and an audio frequency signal voltage is also applied to the control grid by the audio frequency voltage drop across the resistor R11. There is a voltage drop across the resistor R11 because of audio signal current flowing in a circuit extending from the output of the A. F. voltage amplifier tube T3 including the upper portion of the potentiometer R6, resistor R18, condenser C4, and resistor R11, to ground. In this circuit the capacitive reactance of the condenser C4 is relatively high as compared to the resistance of the resistor R11. The current that flows in the circuit including the condenser C4 and the resistor R11 is relatively low as compared to the current flowing in the circuit extending from the output of the A. F. voltage amplifier tube T3 including the upper portion of potentiometer R6, and the condenser C13, to ground. Thus the shifting of the phase of the voltage by the condenser C4 has very little effect upon the phase of the voltage output of the A. F. voltage amplifier tube T3 which bypasses the phase correction tube T4.

The high capacitive reactance of the condenser C4 causes the current through C4 and R11 to lead the output current of the A. F. voltage amplifier tube T3 by approximately 90°. The A. F. voltage drop across the resistor R11, which is in phase with the current, therefore leads the voltage output of the A. F. voltage amplifier tube T3 by 90°. Thus the control grid of the phase correction tube T4 receives an A. F. voltage from the voltage drop across R11 that leads by 90° the voltage output of the A. F. voltage amplifier tube T3 as applied to the upper terminal of the potentiometer R6. The output voltage of the phase correction tube T4 in addition is 180° out of phase with the voltage on the grid of T4.

The A. F. current through the resistor R9, due to the output of T4, to ground, combines vectorally with the current output of the A. F. voltage amplifier tube T3 to provide a laging phase shift to a degree as adjusted by varying the gain of T4 by adjusting its bias control resistor R7. A greater phase shift is accomplished by allowing more current output of the tube T4 to flow through resistor R9.

If a leading phase shift is required, such shift can be accomplished by the transposition of the condenser C4 and resistor R11 with a shunt resistance R in parallel with C4, which is relatively high as compared to the capacitive reactance of the condenser C4, to complete the D. C. grid to cathode circuit.

If a phase shift of greater than 90° is required, such phase shift can be accomplished by employing the phase correction network as described by transposing the connections to the output terminals of the FM discriminator.

According to phase shifting principles similar to those which have been described, the use of a high capacitive reactance condenser C7 in series with a relatively low resistance R12 and connected across the tank circuit of the second oscillator, provides a means by which a leading voltage drop across the resistor R12, at the oscillator frequency, is applied to the control grid circuit of the reactance modulator tube T5, such voltage leading the tank circuit voltage of the second oscillator by 90°.

The output of the reactance modulator tube T5, which is connected to the tank circuit of the second oscillator, therefore has a capacitive effect upon such tank circuit to cause oscillation at a lower frequency. Thus, by introducing the phase corrected audio frequency voltage output of the A. F. voltage amplifier tube T3 into the control grid circuit of the reactance modulator tube T5, the second oscillator can have its frequency modulated in accordance with the modulations of the FM channel of the receiver.

A suitable negative bias for the reactance modulator tube is provided as by the resistor R10 in the anode cathode circuit, and the audio frequency voltage across the resistor R9 is applied to the control grid of the reactance modulator tube T5 through the blocking condenser C5 for governing the capacitive effect of the reactance modulator tube according to the audio frequency modulations of the FM channel of the receiver. It will be noted that it has been heretofore pointed out that the audio frequency voltage across the resistor R9 has been phase corrected in that such voltage is a combination of the output of the A. F. voltage amplifier tube T3 and the output of the phase correction network tube T4.

Although it will be readily apparent to those skilled in the art that other types of oscillators could be employed, the second oscillator stage of the AM-FM receiver illustrated in Fig. 3 is of the Hartley type, and the anode of the tube of the Hartley oscillator is connected to the control grid of the second mixer tube through the coupling condenser C14. It is thus provided that the second oscillator stage has its frequency modulated in accordance with a phase corrected audio signal of the FM channel of the AM-FM receiver, and the modulated frequency voltage of such oscillator is applied to the grid G2 of the second mixer tube T2 for beating with the frequency modulated and amplitude modulated output of the second I. F. amplifier tube T1.

A negative bias for the control grids of the second mixer tube T2 is provided by the cathode bias resistor R13 which is bypassed for radio frequencies by the condenser C9. The voltage drop across the resistor R3 as supplied by the output of the second I. F. amplifier tube T1 excites the control grid of the second mixer tube T2 with a frequency modulated and amplitude modulated voltage. Both frequency and amplitude modulations are present because there has been no preceding discriminator or limiter stages. The suppressor grids of the second mixer tube T2 are connected to ground through a suitable resistor R14.

It is thus provided that the second mixer tube T2 has a frequency and amplitude modulated carrier applied to one control grid G1 and a frequency modulated carrier of a different fundamental frequency applied to another control grid G2 by the second oscillator.

When the phase has been corrected to cause the frequency modulations of the second oscillator tube T6 to match the modulations of the carrier applied to the other control grid G1 of the second mixer tube T2, the output of the second mixer tube T2 is of a constant beat frequency, irrespective of frequency modulations of its input circuits, which is the difference between the two fundamental frequencies applied to the respective control grids G1 and G2 of the second mixer tube T2. Such beat frequency of course carries the amplitude modulation of the AM channel of the carrier wave because such amplitude modulations are present in the carrier applied to the control grid G1 of the second mixer tube T2.

The output of the second mixer tube T2 is fed through successive I. F. amplifier, AM detector, A. F. voltage amplifier and A. F. power amplifier stages to speaker No. 2. The AM detector tube T7, in addition to providing rectification for detecting purposes, serves as an automatic volume control tube to govern the bias of the second I. F. amplifier tube and the third I. F. amplifier tube, the resistors R15 and R16 being provided in the AVC control circuits for filtering purposes.

More specifically, the automatic volume control wire 14 is connected to the upper terminal of the volume control potentiometer R17 and extends to the control grid circuit of the third I. F. amplifier tube T8 through the resistor R15, and to the control grid circuit of the second I. F. amplifier tube T1 through the resistors R15 and R16 in series and to the control grid of T2 through R15 and R23.

The output audio frequency signal of the AM detector is fed from the movable contact of the volume control potentiometer R17 through conventional A. F. voltage amplifier and A. F. power amplifier stages to speaker No. 2.

It is thus provided that the AM channel of the received AM-FM carrier wave is isolated from the FM channel of that wave upon effectively cancelling the FM channel by heterodyning means in the second mixer tube T2. The successive stages of the receiver subsequent to the second mixer will be readily identified as corresponding to stages of a conventional AM super-heterodyne receiver.

Having thus considered specifically the organization of respective apparatus for transmission and reception of AM-FM modulated carrier waves, consideration will now be given to a typical application of the principles heretofore set forth with certain modifications being applied to the specific apparatus that has been described in order to adapt the two-channel communication system to the specific typical railway radio communication organization according to Fig. 6.

In a railroad classification yard it is desirable that a conductor located at the point of cutting cars for classification, as at the crest of a hump in a hump yard, be able to maintain radio communication with respective mobile units at both ends of the yard. The hump locomotive for pushing the cars over the hump is one of the mobile units, and other mobile units are stationed in the yard, on the other side of the hump for performing odd classification functions as directed by the conductor.

It is general practice to divide large classification yards into two yard sections, one yard being adapted for the classification of cars to make up trains for traffic in one direction, and the other section of the yard being particularly adapted for the classification of cars in making up trains for the opposite direction of traffic.

Each of these portions of the yard has its own complement of personnel and equipment, and thus each yard portion has its own conductor and radio communication system whereby he can communicate with mobile units at various points in that portion of the yard without interference from the other yard portion. For convenience in describing this embodiment of the present invention, one portion of the yard is designated in Fig. 6 as the "West Yard," and the other portion is designated as the "East Yard."

The conductor of station A is located at the crest of the hump in the west yard, and from such station he can communicate with the various mobile units of the west yard, including a hump mobile unit No. 1 and a yard mobile unit No. 2.

Similarly the conductor at station B is at the crest of the hump of the east yard, and from such station he can maintain radio communication with the mobile units within the east yard including a hump mobile unit No. 3 and a yard mobile unit No. 4.

Inasmuch as the conductors stations A and B for the respective west and east yards are not too far apart, transmitter and receiver apparatus can readily be common to both stations, and according to the principles of the present invention, the FM channel is assigned to station A and the AM channel to station B. Thus a conductor speaking into the microphone FM—MK of station A causes FM modulation of the carrier wave transmitted from the F1 transmitter which is common to both stations A and B.

The conductor at station B, by speaking into the microphone AM—MK, provides amplitude modulation for the carrier wave radiated from the F1 transmitter. Inasmuch as such transmitter has only one frequency assign thereto, it transmits simultaneously both AM and FM modulations at the carrier frequency F1, the AM modulations being associated with station B and the FM modulations being associated with station A.

Inasmuch as the mobile units may be transferred from the east yard to the west yard or vice versa, their receiver units must be adapted to receive either AM or FM channels at the frequency F1 as required in accordance with the location or assignment of such units. This being the case it is particularly desirable to provide a single loudspeaker for the receiver of each of the mobile units which can be selectively responsive to either the AM channel or the FM channel, in accordance with the manual actuation of a switch for selecting either channel in accordance with the particular east or west yard in which the mobile unit is working. Thus it is illustrated in Fig. 6 that each of the mobile units has a F1 receiver provided according to Fig. 5.

With reference to Fig. 5 an AM-FM receiver is illustrated in which the reception of the respective AM and FM channels is provided in a manner which has been heretofore specifically described with reference to Fig. 3, except that a single power amplifier and a single loadspeaker is common to both channels of the receiver in that such apparatus is selectively connected to the AM channel or FM channel by the actuation of the selector switch SW.

A mobile unit working in the east yard is interested in receiving instructions from the conductor on the AM channel, and thus the mobile units Nos. 3 and 4 (see Fig. 6) of that yard have their receivers set with the switch SW of Fig. 5 actuated to its lower position to select the actuation of the speaker in response to the AM channel. The other mobile units Nos. 1 and 2, however, are illustrated in Fig. 6 as being in the west yard, and therefore the receivers of such units have their selector switches SW positioned to select reception on the FM channel, as by the actuation of switch SW of Fig. 5 to its upper position. It will be readily apparent from the description as it has been set forth that the output of the upper of the two AF voltage amplifiers of the Fig. 5 block diagram, which is connected to the upper terminal of the switch SW, is the audio signal of the FM channel; and the output of the lower of the two A. F. voltage amplifiers of the diagram, which is connected to the lower terminal of the switch SW, is in response to the AM channel.

Inasmuch as there may be elements of safety and/or time loss involved, due to failure of a mobile unit to receive instructions from the conductor, because of a failure in the communication apparatus, it is desirable that each channel of the conductor's transmitter transmit a check tone when that conductor is not speaking into his microphone. Such check tone is effective to provide a continuous indication in the respective mobile units governed by that conductor, except at times when the conductor is talking. Thus, if a trainman in a mobile unit observes the extinguishing of his check tone indicator, he is to expect to receive a message from the conductor, and failure to receive such message is readily identified as a failure of the communication apparatus. Under such conditions the mobile unit trainman would immediately get in touch with the conductor by his radio transmitter and inform the conductor of his failure to receive the conductor's message.

The use of check tone for somewhat similar purposes is disclosed in the prior patent to V. C. Chappell, No. 2,280,421, dated April 21, 1942, to which reference can be made for a more detailed description of the use and advantages of a check tone.

It is thus desirable that the F1 transmitter of Fig. 6 be provided according to the transmitter illustrated, partially by block diagram, in Fig. 4. This transmitter will be readily identified as corresponding to the transmitter of Fig. 1 which has been described, except for the addition of a check tone and push-to-talk buttons to the respective FM and AM channels.

It is thus provided that the microphone FM—MK is normally disconnected by the push-to-talk button FM—TB, such button being provided with a normally closed contact which connects the output of a suitable tone generator to the input circuit of the reactance modulator. It is thus provided that normally, when the button FM—TB is not depressed for the transmission of a voice message, a suitable tone is applied to the FM channel of the transmitter for actuation of relays in the respective mobile units. The depression of the button FM—TB, when a conductor desires to talk, opens the circuit for the tone generator and closes the circuit to connect the FM—MK microphone circuit to the reactance modulator.

In a similar manner a tone generator normally applies a tone voltage to the input of the A. F. amplifier, through the normally closed contact of the push-to-talk button AM—TB. When a conductor desires to talk over the AM channel of the transmitter, he actuates the button AM—TB and thereby disconnects the tone generator associated with that channel and connects the AM—MK microphone circuit for governing the input to the A. F. amplifier.

With reference to Fig. 5, the reception of the tones of the respective channels is accomplished as if such tones were voice messages, audio frequencies being preferably used for the respective tones, and the same tone frequencies being assigned to both AM and FM channels. In the reception of a tone, the secondary winding 15 of the output transformer 16 is effective to energize the relay CT through a suitable filter which is tuned to the tone frequency and a suitable rectifier 17. The energization of the relay CT in response to a tone transmitted on the AM or FM channel, as selected by the switch SW, is effective by the closure of its front contact 18 to energize the tone indicator lamp CK.

It will be readily apparent that when a conductor removes a check tone and transmits a voice message, the relay CT is deenergized because of failure to receive a tone, and the dropping away of such relay in addition to opening the circuit for the check tone lamp CK at front contact 18 to cause that lamp to be extinguished, closes the circuit for the speaker at back contact 19 to condition the speaker for the reception of the voice message. It will be noted that the speaker is normally disconnected from the lower secondary winding 20 of the output transformer by the opening of back contact 19, and thus is not responsive to any noises that would normally be heard in the speaker when no voice messages are being transmitted.

It is desirable that in addition to providing for radio communication by which the respective conductors can talk with their respective mobile units, it is desirable that the respective mobile units have transmitters by which they can talk with the conductors, and ask for instructions, or clarification of orders that they have received. It is therefore desirable that the respective mobile units have transmitters adapted to transmit to either conductor for instructions, which can best be accomplished by the use of AM-FM transmitters on a distinctive frequency from an AM-FM transmitter which is used by the conductors. Thus in Fig. 6 each mobile unit is illustrated as having a F2 transmitter provided according to the transmitter of Fig. 1. Such transmitter has been described as providing separate microphones for the respective AM and FM channels, whereby the radiated carrier wave can have applied thereto AM and FM modulations. If it is not required that the AM and FM channels be transmitted simultaneously from a mobile unit, a single microphone may be used, and selectively connected by suitable switching means to the particular AM or FM channel corresponding to the conductor with which that mobile unit desires to communicate. If it is desired that a trainman in a mobile unit transmit only to the conductor to whom his receiver is selected as being responsive, the selection of a single microphone control circuit for connection to the respective AM and FM channels can be effected by the same switch SW (see Fig. 5) as is used for selecting to which channel the speaker is to be responsive for the reception of messages on the frequency F1.

It is readily understood by those skilled in the art, in view of the fact that the assignment of different carrier frequencies for radio communication is considerably limited, that the two-channel communication system provided by the invention provides for maximum communication facilities for the respective carrier frequencies available.

Thus, assuming that only two distinctive frequencies can be assigned to a classification yard organization such as has been described, with conventional single channel communication systems, it would be necessary, as is standard practice, to assign one frequency for the conductor's transmitter for the east yard, and another frequency for the conductor's transmitter for the west yard. Then in order to maintain two-way communication between the respective conductors and their mobile units, problems arise as to means by which a conductor may butt in upon the transmission of a mobile unit if it is necessary that he provide instructions for such unit immediately. To solve such problem, considerable apparatus is generally required to provide for intermittent, preferably supersonic, interruptions in transmission as a means for allowing a superior party to break in upon the transmission.

By the communication organization for the classification yard as illustrated in Fig. 6, this problem does not arise, as a better use of the two frequencies assumed to be assigned to the yard is made to provide the two-way transmission, and thus there need be no interruption in the conductor's transmitter, and he at any time can speak to his respective mobile units, irrespective of whether or not one of such units is transmitting at that time.

The idea of being able to maintain the conductor's F1 transmitter continuously active is also in accord with the desirability of maintaining the check tones continuously applied when no message is being transmitted. If interruption in the transmission is required for the purpose of allowing the initiation of transmission from a mobile unit, in order to maintain the check tone indicator lamps effective, such interruption is necessarily of a very short interval in order that the extinguishing of the check tone lamps under such conditions is not effective to provide an erroneous indication.

Having specifically described two embodiments of a two-way communication system according to the present invention, it is desired to be understood that this form is selected to facilitate in the disclosure of the invention rather than to limit the number of forms which the invention may assume, and it is to be further understood that various adaptations, alterations and modifications may be applied to the specific form shown to meet the requirements of practice, without in any manner departing from the spirit or scope of the present invention, except as limited by the appending claims.

What we claim is:

1. In a communication receiver for receiving the amplitude modulation channel of a carrier wave having both frequency modulation and amplitude modulation signals, radio frequency and intermediate frequency amplification stages effective to amplify carriers having both amplitude modulation and frequency modulation signals, an oscillator generating a predetermined fundamental frequency, means for modulating the frequency of said oscillator directly in accordance with said frequency modulation signal, and a mixer stage for beating the output carrier of said intermediate frequency amplifier having both amplitude modulation and frequency modulation signals with the modulated frequency of said oscillator, whereby the output carrier of said mixer stage is at a constant frequency and is amplitude modulated according to the amplitude modulation signal of said carrier wave.

2. In a radio communication receiver of the character described for receiving the amplitude modulation channel of a carrier wave having both frequency modulation and amplitude modulation signals, radio frequency and intermediate frequency amplifier stages effective to amplify respective carriers having both said amplitude modulation and frequency modulation signals, limiter and discriminator stages effective to reduce said frequency modulation signal as applied to the carrier output of said intermediate frequency amplifier stage to a first audio frequency signal, an oscillator for generating a predetermined fundamental frequency different from the carrier frequency of said intermediate frequency amplifier stage, a reactance modulator for modulating said oscillator in accordance with the modulations of said first audio frequency signal, a mixer stage for beating the output carrier of said intermediate frequency amplifier with the modulated frequency of said oscillator, and amplifier and detector stages for respectively amplifying the amplitude modulated signal output of said mixer stage and reducing that signal to a second audio frequency signal having a signal corresponding to the amplitude modulating signal of said carrier wave.

3. In a communication receiver for receiving the amplitude modulation channel of a carrier wave having both frequency modulation and amplitude modulation signals simultaneously applied thereto, radio frequency and intermediate frequency amplifier stages having their output carriers amplitude and frequency modulated according to the signals of said carrier wave, an oscillator for generating a predetermined fundamental frequency distinctive from said intermediate frequency, means for modulating the frequency of said oscillator directly in accordance with said frequency modulation signal, a mixer stage for beating the output carrier of said intermediate frequency amplifier with the modulated frequency of said oscillator, and phase correction means manually adjustable to match the phase of the modulation of the frequency modulated signal input to said mixer stage from said oscillator with the phase of the modulation of the frequency modulated signal carrier input to said mixer stage from said intermediate frequency amplifier, whereby the output of said mixer stage is a carrier of constant frequency amplitude modulated according to said amplitude modulation signal of said carrier wave.

4. In a radio communication receiver for receiving respective frequency modulation and amplitude modulation signals simultaneously on the same carrier wave, an electro-responsive device for each of said signals, frequency modulation channel receiving means including radio frequency and intermediate frequency amplifier, limiter and discriminator stages respectively for operating one of said electro-responsive devices in accordance with the modulation of said frequency modulation signal of said carrier wave, said limiter stage being effective to prevent distortion by said amplitude modulation signal, and amplitude modulation channel receiving means including said radio frequency and said intermediate frequency amplifier stages for operating the other of said electro-responsive devices in accordance with the modulation of said amplitude modulation signal, said amplitude modulation receiving means comprising heterodyning means for reducing the frequency modulation which is present in the output of said intermediate frequency amplifier stage to a constant intermediate frequency and thereby prevent distortion of or interference with the reception of said amplitude modulation signal by said frequency modulation signal.

5. Apparatus for receiving frequency modulated and amplitude modulated signals simultaneously on the same carrier wave comprising two electro-responsive devices, a frequency modulation receiver comprising a limiter for preventing distortion or interference by said amplitude modulated signal for governing one of said devices, and an amplitude modulated receiver for actuating the other of said electro-responsive devices comprising means for reducing said frequency modulated carrier to a constant beat frequency for preventing distortion or interference by said frequency modulated signal.

6. In a communication receiver, the method of receiving an amplitude modulation signal impressed on a frequency modulated carrier wave comprising heterodyning said carrier wave to an intermediate frequency amplitude modulated and frequency modulated carrier, limiting said intermediate frequency carrier to remove said amplitude modulation signal, converting said frequency modulation signal of said intermediate frequency carrier to an audio frequency signal, correcting the phase of said audio frequency, generating a second carrier at a distinctive fundamental frequency, modulating said second carrier according to the phase corrected audio frequency signal, and heterodyning said intermediate frequency carrier having amplitude and frequency modulation with said second carrier having frequency modulation only to cancel out the frequency modulation and obtain a constant intermediate frequency having only amplitude modulation according to the amplitude modulation of said carrier wave.

7. In a communication receiver the method of receiving substantially without distortion the amplitude modulation channel of a carrier wave having both amplitude and frequency modulation signals simultaneously applied thereto comprising, heterodyning said carrier wave to an intermediate frequency amplitude modulated and frequency modulated carrier, generating a second carrier frequency, modulating said second carrier in accordance with the modulation of said frequency modulation signal of said carrier wave, and beating said intermediate frequency amplitude and frequency modulated carrier with said frequency modulated second carrier, whereby a carrier is obtained having the frequency modulation channel removed and only the amplitude modulation channel remaining.

8. In a communication receiver, the method of receiving an amplitude modulated signal impressed on a frequency modulated carrier wave substantially without distortion or interference due to frequency modulation, comprising heterodyning said carrier to an intermediate amplitude modulated and frequency modulated carrier, beating said amplitude modulated and frequency modulated intermediate frequency carrier with a carrier having frequency modulation corresponding to the frequency modulation of said carrier wave but not having amplitude modulation to obtain an amplitude modulated carrier of substantially constant frequency, and converting said amplitude modulated carrier of substantially constant frequency to an audio frequency signal in accordance with intelligence received by said amplitude modulated signal on said carrier wave.

9. The combination with respective frequency modulation and amplitude modulation transmission channels for applying respective frequency modulation and amplitude modulation signals to a radiated carrier wave, of a microphone and a check tone generator for each of said channels, and means for selectively connecting said microphone or said tone generator to its respective channel, whereby a check tone is transmitted by each channel of said carrier wave when the microphone for that channel is rendered ineffective.

10. In a communication receiver for receiving selectively frequency modulation or amplitude modulation signals simultaneously applied to a single carrier wave, an electro-responsive device, frequency modulation channel receiving means comprising a limiter for preventing distortion and interference by said amplitude modulation signal, amplitude modulation channel receiving means comprising means for reducing said frequency modulated carrier to a constant beat frequency for preventing distortion and interference by said frequency modulation signal, and means for selectively connecting said electro-responsive device to the output of said frequency modulation channel receiving means or said amplitude modulation channel receiving means.

11. In apparatus for receiving frequency modulation and amplitude modulation signals simultaneously on the same carrier wave, the combination with frequency modulation channel receiving means comprising a limiter for preventing distortion and interference by said amplitude modulation signal, amplitude modulation channel receiving means comprising means for reducing said frequency modulation carrier to a constant beat frequency for preventing distortion and interference by said frequency modulation signal, of an indicator responsive only to the reception of a signal of a given frequency, an electro-responsive device, and means for selectively connecting said indicator and said electro-responsive device to the output of either said frequency modulation channel receiving means or said amplitude modulation channel receiving means.

12. In a communication system affording separate channels of communication for two stations with selected groups of mobile stations, a transmitter common to both stations effective when rendered active to transmit a carrier wave having both amplitude modulation and frequency modulation signals, said transmitter including a microphone at a given one of said stations for governing said amplitude modulation signal and another microphone at the other of said stations for governing said frequency modulation signal, a receiver in each of said mobile units having respective channels for the reception of said frequency modulation and amplitude modulation signals, said receiver having an electro-responsive device common to both channels, and manually operable means in each of the mobile units for selectively associating said electro-responsive device with either said frequency modulation or said amplitude modulation channels of said receiver in accordance with whether that mobile unit is operating in a group to receive its orders from said given station or said other station.

13. In a communication system affording separate channels for communication for two stations with selected groups of mobile units, a transmitter and a receiver common to both stations, said transmitter being tuned to transmit at a first frequency and said receiver being tuned to be responsive to a second frequency, said transmitter being effective to transmit a carrier wave having amplitude modulation in accordance with intelligence transmitted from one of said stations and frequency modulation in accordance with intelligence transmitted from the other of said stations, said receiver being effective to render a loudspeaer in one of said stations responsive only to frequency modulation of a received carrier wave at said second frequency having both frequency modulation and amplitude modulation, and said receiver being effective to render a loudspeaker in the other of said stations responsive only to amplitude modulation of a received carrier wave at said second frequency having both frequency modulation and amplitude modulation, and a mobile transmitter and a mobile receiver in each of said mobile units, said mobile transmitter being tuned to transmit said second frequency and said mobile receiver being tuned to said first frequency, said mobile transmitter being effective to transmit a carrier wave having either or both frequency modulation and amplitude modulation, and said mobile receiver being effective to receive selectively either the frequency modulation signal or the amplitude modulation signal of the frequency modulated and amplitude carrier wave at said first frequency substantially without distortion or interference.

JOHN C. O'BRIEN.
ROBERT B. HANER.

REFERENCES CITED

The following references are of record in the file of this patent:

UNITED STATES PATENTS

| Number | Name | Date |
|---|---|---|
| 2,233,183 | Roder | Feb. 25, 1941 |
| 2,280,420 | Chappell | Apr. 21, 1942 |
| 2,292,222 | Haigis | Aug. 4, 1942 |
| 2,357,975 | Roberts | Sept. 12, 1944 |
| 2,363,571 | Chaffee | Nov. 28, 1944 |
| 2,378,298 | Hilferty | June 12, 1945 |
| 2,386,528 | Wilmotte | Oct. 9, 1945 |